Figure 1:
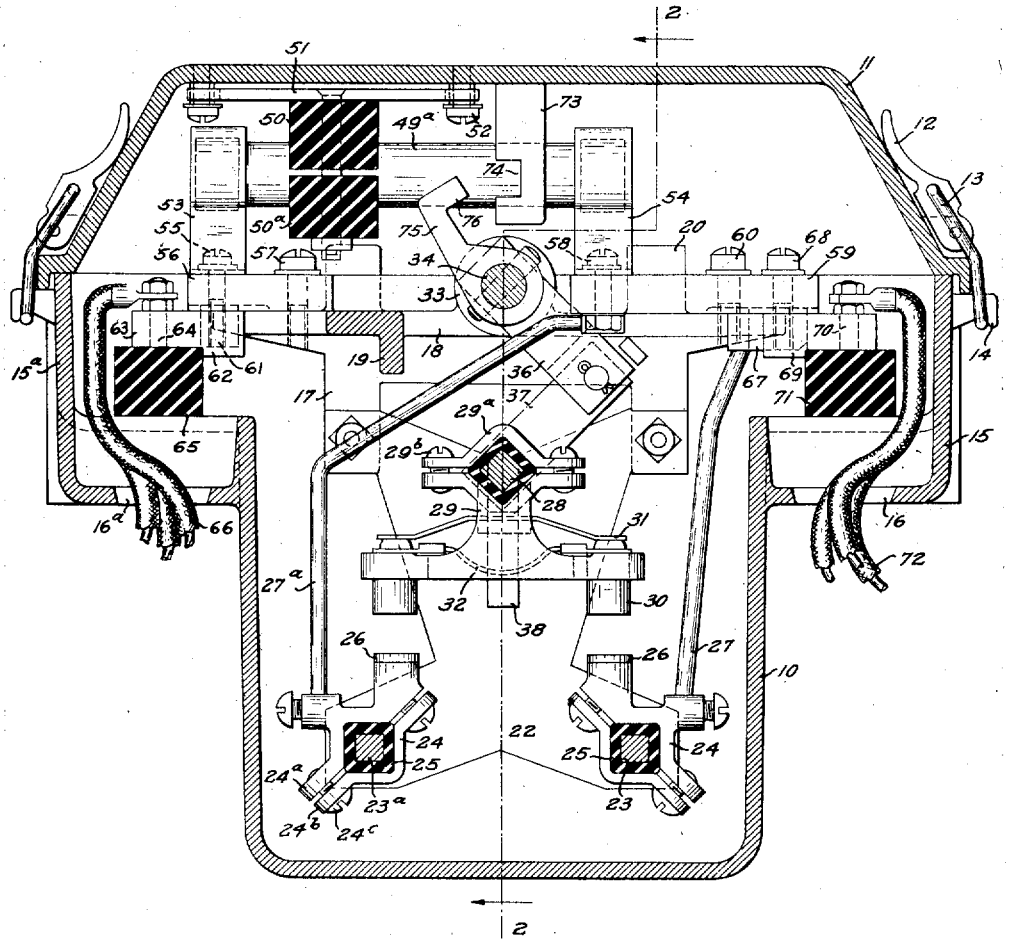

H. W. CHENEY.

SWITCH.

APPLICATION FILED FEB. 19, 1917.

Reissued July 16, 1918.

14,493.

3 SHEETS—SHEET 1.

Inventor

H. W. Cheney by G. P. Dewey

Attorney

H. W. CHENEY.

SWITCH.

APPLICATION FILED FEB. 19, 1917.

Reissued July 16, 1918.

14,493.

3 SHEETS—SHEET 2.

Inventor

H. W. Cheney by G. P. Dewein

Attorney

H. W. CHENEY.

SWITCH.

APPLICATION FILED FEB. 19, 1917.

Reissued July 16, 1918.

14,493.

3 SHEETS—SHEET 3.

Inventor

H. W. Cheney by G. F. Dillon

Attorney

UNITED STATES PATENT OFFICE.

HERBERT W. CHENEY, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SWITCH.

14,493. Specification of Reissued Letters Patent. Reissued July 16, 1918.

Original No. 1,177,016, dated March 28, 1916, Serial No. 529,066, filed November 20, 1909. Application for reissue filed February 19, 1917. Serial No. 150,284.

*To all whom it may concern:*

Be it known that I, HERBERT W. CHENEY, a citizen of the United States, residing at Milwaukee, in the county of Milwaukee and State of Wisconsin, have invented certain new and useful Improvements in Switches, of which the following is a full, clear, and exact specification.

This invention relates to improvements in switches and particularly in oil switches.

One of the main objects of my invention is the provision of a switch which may be employed with safety in buildings such as textile works containing highly inflammable material, without any danger of the material being ignited either by arcing at the contact terminals when the switch is opened or closed or by the blowing of fuses.

A further object is the provision of an oil switch so constructed that the entire switch mechanism may be readily removed from the oil tank or inclosure for the purpose of inspection, cleaning, repairing, etc., without any danger of the operator or person handling the switch being injured by live parts.

A further object is the provision of an oil switch including an inclosure having a cover which on being removed so as to expose the contact mechanism in the interior of the inclosure disconnects the contact mechanism from the line or supply conductors, and which can be removed or again placed back on the main or body portion of the inclosure only when the switch is open.

In carrying out one part of my invention I provide a switch having a novel form of quick make-and-break operating mechanism by which the switch is both opened and closed with a snap action.

Invention further resides in the provision of fuses in the inclosure of the switch and preferably in the cover, the fuses being removable with the cover and being adapted to be connected to or disconnected from the line terminals and the contact terminals or mechanism when the cover is placed in position or removed.

In carrying out another part of my invention, I provide switch mechanism in the form of a self-contained unit which is so constructed and supported in the inclosure that it can be removed as a whole after the cover is removed and the contact mechanism is disconnected from the current supplying or line conductors, and I provide an oil-containing inclosure or casing for the switch mechanism which has lateral extensions of the side walls thereof whereby the normal oil-containing portion of the inclosure may be of less size, especially as to horizontal cross-sectional area, than the upper portion, and I mount in said upper portion fixed contact members adapted to be connected to the line conductors and detachably engageable by portions conductively connected to the fixed contacts of the movable self-contained switch unit.

As another important feature of my invention I provide interlocking parts on the cover and operating mechanism of the switch, these parts preventing removal and restoration of the cover except when the switch is in open position. Thus by providing a construction wherein the cover is removable only when the switch is open and having means for disconnecting the line terminals from the switch when the cover is removed, there is practically no danger of a short circuit occurring or of the operator being injured when the parts on the interior of the inclosure are exposed.

My invention also resides in certain other novel features of construction and arrangements of parts which will be described in the specification and set forth in the appended claims.

Reference is had to the accompanying sheets of drawings wherein:—

Figure 2:
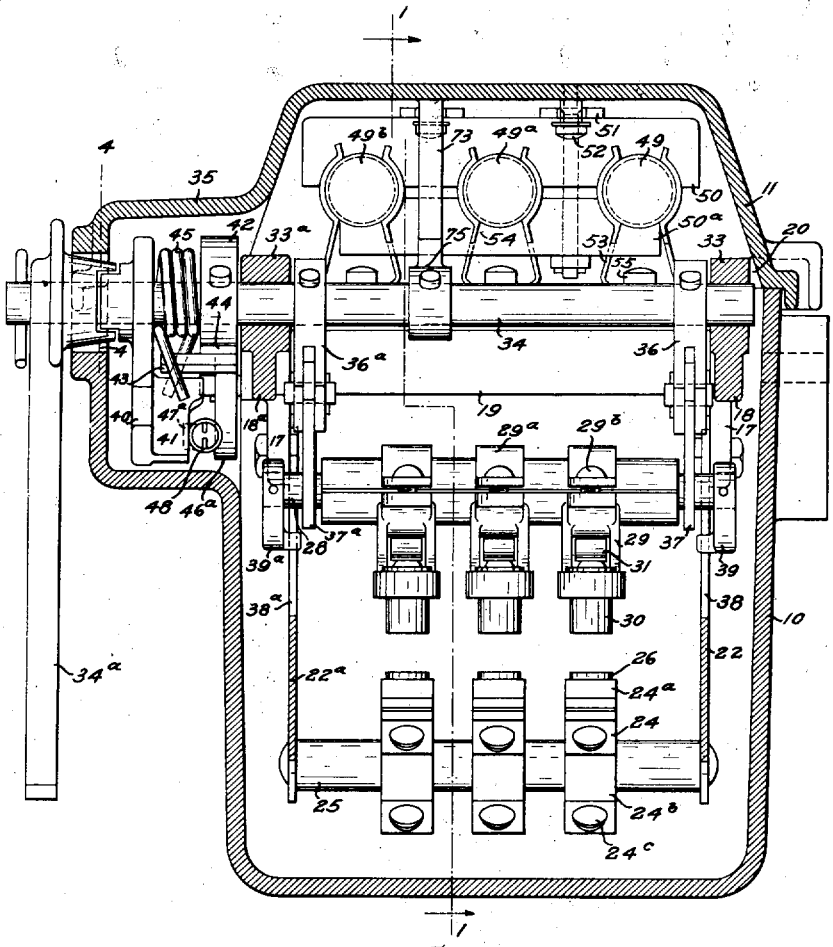
Figure 3:
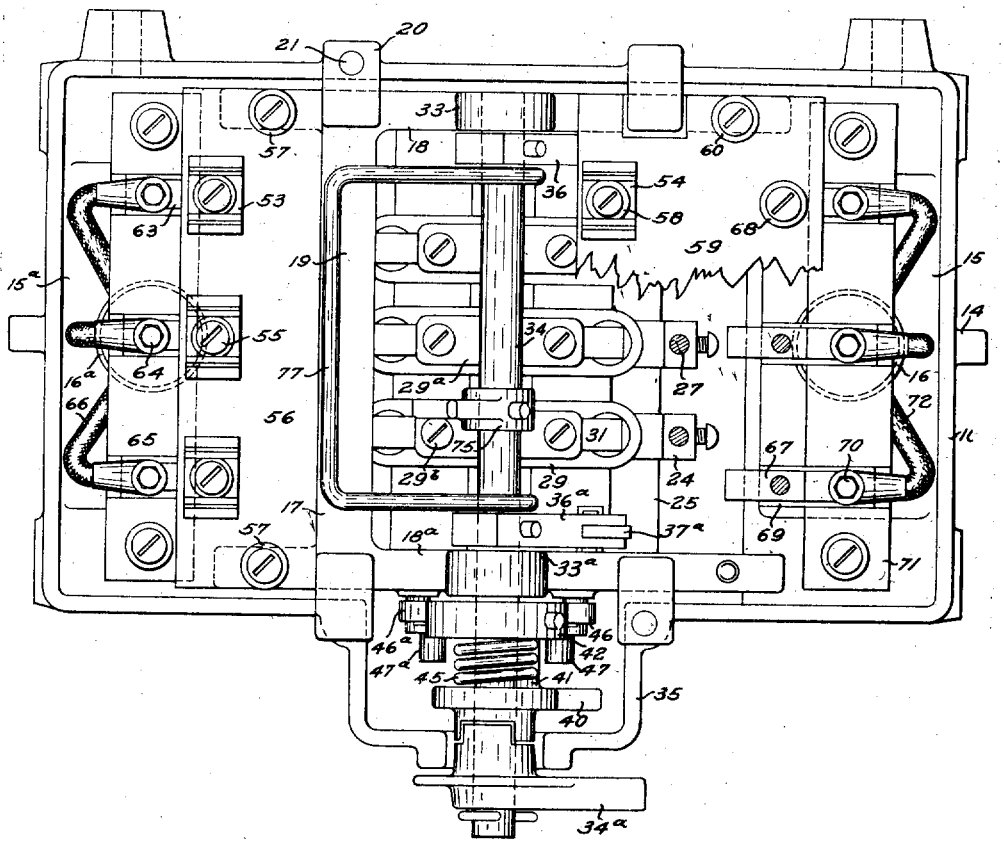
Figure 4:
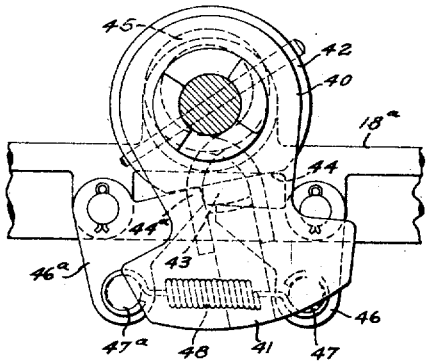

Figure 1 is a vertical sectional view along the irregular line 1—1 of Fig. 2 looking in the direction indicated by the arrows through a switch constructed in accordance with the preferred form of my invention. Fig. 2 is a vertical sectional view of the same substantially along the irregular line 2—2 of Fig. 1 looking in the direction indicated by the arrows, the movable parts of the operating mechanism being shown in elevation and other parts being omitted for the sake of clearness. Fig. 3 is a top plan view of the switch with the cover removed and with portions broken away for the sake of clearness. Fig. 4 is a sectional view of part of the operating mechanism substantially along the line 4—4 of Fig. 2.

Referring now to the figures of the drawings, it will be seen that I have provided a switch having an inclosure consisting of a main or body portion 10 forming a tank adapted to contain oil and to receive the contact mechanism, and a cover 11 which may be removed from the main portion 10 and may be clamped down onto the top of the latter by means of latches 12 which are pivoted to the cover by links 13 connected to the latches and adapted to engage suitable lugs 14 on opposite sides of the tank. The body portion 10 of the inclosure is provided on opposite sides with lateral extensions 15 and 15ª on which bars of insulating material are supported as will be explained presently, and through the bottom of which the "leading-in" or line conductors and the "leading-out" conductors are adapted to be brought, these extensions having for this purpose in the lower portions thereof centrally located openings 16 and 16ª through which the conductors to be referred to presently, extend. This construction of the oil-containing, switch-inclosing casing provides, as indicated in the drawings, a main lower portion of considerably smaller horizontal cross-sectional area than the upper portion, that is, the portion which includes the extensions 15, 15ª, being designed to receive certain electrically conductive parts and the supports therefor which are not necessarily required to be immersed in oil in order to secure satisfactory operation of the apparatus; thus the lower part of the casing which is designed to receive the active circuit-rupturing contacts of the switch mechanism may be of a minimum size to receive these contacts and to properly immerse the same in oil, and, likewise, the amount of oil required for the immersion of these contacts may be a minimum.

The contact mechanism and other parts of the operating mechanism are supported upon a cast metal frame 17 which is provided with a pair of side bars 18 and 18ª extending along two sides of the tank and with a cross bar 19 connecting the side bars. This frame 17 is supported on the body 10 of the inclosure by four integral ears or lugs 20 shown most clearly in Fig. 3, which lugs project outwardly from the side bars 18 and 18ª and rest upon suitable bosses provided adjacent the top of the body portion of the inclosure. The frame may be held in position by dowel pins 21 which extend from the top edge of the body 10 of the inclosure and through openings in the laterally projecting ears 20. In Fig. 3 of the drawings, I have shown in plan view two such dowel pins which extend through openings in two diagonally opposite ears 20. These dowel pins not only hold in position and center the supporting frame 17 but permit the latter, together with the mechanism supported thereby, to be readily lifted from the inclosure or tank as a unit.

Secured to the side bars 18 and 18ª of the supporting frame 17 and extending downwardly into the inclosure are two end plates 22 and 22ª which support the contact mechanism. The stationary contact mechanism is supported upon a pair of rods 23 and 23ª extending between the lower portions of the end plates 22 and 22ª, these rods supporting, in this case, a plurality of pairs of contact frames 24 each of which consists of two parts 24ª and 24ᵇ which are clamped about the rod by screws 24ᶜ, these contact frames being separated from the rods by insulation 25. The contact frames are provided at their upper faces with contacts 26 adapted to be engaged by movable contacts to be referred to presently, and each of the frames supported on rod 23 has clamped thereto a contact terminal rod 27, and each of the frames supported on rod 23ª has clamped thereto a contact terminal rod 27ª. I have here shown a three-pole switch; consequently there are three pairs of stationary contact frames and contacts and three movable bridging contact members, each adapted to bridge one pair of stationary contacts. The movable contact mechanism is supported on a vertically movable horizontal rod 28 having secured thereto, in this case, three yokes 29 which are clamped to the rod by caps 29ª and screws 29ᵇ. Each yoke is provided with a pair of movable contacts 30 adapted to bridge a pair of stationary contacts 26, each pair of movable contacts being pressed yieldingly downward by a leaf spring 31, and being connected together by a flexible conductor 32.

Supported in bearings 33 and 33ª on opposite side bars of the supporting frame 17 is an operating shaft 34 which extends through a boss-like extension 35 on one side of the frame, the free end of the shaft passing through an annular opening in the side of the inclosure, half of the opening being formed in the top of the body portion 10, and half in the adjacent portion of the cover. The shaft 34 has secured thereto a pair of cranks 36 and 36ª to which are pivotally secured links 37 and 37ª, the lower ends of which are loosely connected to the cross rod 28 carrying the movable contacts. These cranks and links transmit the movement of the operating shaft 34 to the cross rod 28, and in order that the latter may be guided and be given vertical movement, the end plates 22 and 22ª are provided with vertical slots 38 and 38ª, and these slots receive with a sliding fit cross heads 39 and 39ª which are secured to the ends of the cross rod 28. Thus it will be seen that if the operating shaft 34 is rocked in one direction the cross rod and movable contacts will be lowered and the switch will be closed, and if the shaft is rocked in the opposite direction the movable contacts will be raised and the switch will be opened.

At the outer or free end of the shaft 34 is an operating handle 34ᵃ. The shaft is not rocked directly by the handle but I have provided a simple but effective form of quick make-and-break operating mechanism which will cause the shaft and the movable contact mechanism to be shifted with a snap action, and this operating mechanism will now be explained. The handle 34ᵃ is loosely mounted on the shaft 34 so that it may move relatively thereto, and is connected by interlocking portions to a member 40 also loosely mounted on the shaft but movable with the handle, this member 40 being provided on its inner side with an inwardly extending projection or tongue 41. Secured to the shaft between the bearings 33ᵃ and the member 40 and spaced a short distance from the latter is a member 42, which is provided with a finger 43 projecting toward the member 40 and on opposite sides of the finger 43 with a pair of notches 44 and 44ᵃ shown by dotted lines in Fig. 4. Surrounding the shaft and located between the members 40 and 42 is a coil spring 45, the ends of which are bent downwardly and on opposite sides of the tongue 41 and pin 43; in other words the tongue 41 and pin 43 are located between the free ends of the spring. Coöperating with this member 42 and pivotally mounted on the side bar 18ᵃ of the supporting frame are two pawls or latches 46 and 46ᵃ having nose portions adapted to engage respectively in the notches 44 and 44ᵃ and having at the lower portions lateral or outwardly projecting pins 47 and 47ᵃ which are connected together by a coil spring 48 shown most clearly in Fig. 4, this spring serving to press the upper nose portions of the pawls toward the notches of the member 42. Normally one of the pawls engages one of the notches of the member 42 and as shown in Fig. 4 pawl 46ᵃ engages notch 44ᵃ, and as will appear presently, prevents the operating shaft being moved to the left or in a clockwise direction, when the parts are viewed as in Fig. 4, until after it has been shifted from the notch 44ᵃ. The operation of this part of the mechanism will now be explained. If the handle is moved in a clockwise direction, as viewed in Fig. 1, the end of the spring which engages the left side of the tongue 41 as viewed in Fig. 4, will be moved in a clockwise direction, while the other end of the spring, because of its engagement with the finger 43 of member 42, is held stationary, this member 43 also being held stationary because of the engagement of the pawl 46ᵃ in the notch 44ᵃ. Energy will thus be stored in the spring by this movement of the handle and after the latter has been moved a predetermined distance the laterally projecting tongue 41 strikes the pin 47ᵃ of pawl 46ᵃ and shifts the latter from the notch 44ᵃ after which the spring 45 in which energy was stored by the movement of the handle turns the member 42 and the operating shaft 34 with a snap action in the same direction that the handle was moved. This movement of the operating shaft causes the switch to be closed with a snap action. In a similar manner if the handle is moved in a counterclockwise direction, energy will first be stored in the spring 45 and after a predetermined movement of the handle, pawl 46, which was shifted into engagement with the notch 44 during the previous movement of the member 42, is released from the notch 44 by the engagement of the tongue 41 with the outwardly projecting pin 47 of the pawl, with the result that the operating shaft will be rocked by the spring 45 with a quick movement and the switch will be opened with a snap action. This opening and closing of the switch with a snap action reduces arcing to a minimum and renders the use of the switch comparatively safe even in buildings having inflammable material.

To limit the volume of current passing through the switch and to avoid the necessity for fuses arranged in the open exterior to the switch, I provide fuses on the interior of the inclosure and their arrangement and manner of connection will now be explained. These fuses, one of which is provided for each conductor of the system, are shown at 49, 49ᵃ and 49ᵇ, and, as will be seen, are arranged in the cover 11 of the inclosure and are adapted to be removed with the cover and to be disconnected from the switch and contact terminals when the cover is removed. As will be seen from Figs. 1 and 2 of the drawings, the fuses are clamped between insulating blocks 50 and 50ᵃ which are secured to plates 51 fastened by screws 52 to the underside of the cover 11. The fuses are adapted to be connected to the line terminals and to the switch or contact terminals respectively when the cover is placed in position, and to be disconnected from the line and switch terminals when the cover is removed, by two sets of spring jaws 53 and 54. The jaws 53 are secured at their bases by screws 55 to a wooden or other insulating cross bar 56 which extends between the side bars 18 and 18ᵃ of the supporting frame 17 and is secured to such side bars by screws 57. The spring jaws 54 are secured at their bases by screws 58 to a wooden or other insulating cross bar 59 also extending between the side bars 18 and 18ᵃ of the supporting frame 17, this bar 59 being secured to the side bars by screws 60.

To the lower ends of the screws 55 which secure the jaws 53 to the supporting bar 56 and are electrically connected to these jaws 53, are secured metal blocks 61 which engage spring jaws 62 of metal blocks 63 which are secured by bolts 64 to a wooden or other insulating supporting bar 65 which rests upon suitable shoulders formed by the extension 15ª of the frame or inclosure. The bolts 64 form terminal bolts to which are secured the terminals of the line conductors which carry the current between the source of current and the switch, or the "leading-in" conductors as distinguished from the conductors which carry the current between the switch and the electro-receptive device or devices. These conductors which are shown at 66, are brought into the inclosure through the openings 16ª in the bottom of extension 15ª.

The lower ends of bolts 58 which secure the spring jaws to the insulating support 59 and are electrically connected to the jaws, are connected at their lower ends to the terminal conductors 27ª which, as stated before, are clamped and are electrically connected to the stationary contact frames 24 mounted upon the supporting rod 23ª. The terminal conductors 27, which are connected to the contact frames 24 mounted upon the supporting rod 23, are connected at their upper ends to blocks 67 which are secured by screws 68 to the underside of the insulating supporting bar 59, and these blocks 67 engage spring jaws 69 of metal blocks which are secured by terminal screws 70 to a wooden or other insulating supporting bar 71 resting upon shoulders formed by the extension 15. These terminal screws 70 are adapted to be electrically connected separately to the terminals of "leading-out" conductors 72, the expression "leading-out" being used to distinguish from the line conductors or the conductors which carry the current to "leading-in" conductors above described. Thus it will be seen that when the cover is in place and the fuses engage and are electrically connected to the jaws 53 and 54, current passes from the conductors 66 to the terminal screws 64, to the spring jaws 62, to the blocks 61 and screws 55, to the spring jaws 53 through the fuses to the jaws 54, thence by screws 58 to the conductors 27ª, thence through the coöperating stationary and movable contacts (assuming that the switch is closed) to the conductors 27, and thence to the blocks 67, spring jaws 69, and screws 70 to the "leading-out" conductors 72.

It will be seen that if the cover is removed the contact mechanism of the switch is disconnected from the line or current supplying conductors 66. In order that the contact mechanism may not be exposed by the removal of the cover when the switch is closed, I have provided means which prevent the removal of the cover unless the switch is open, and this will now be explained. By referring particularly to Fig. 1 it will be seen that the cover is provided with a downwardly extending lug or projection 73 which is provided with a lateral recess or notch 74. The shaft is provided just below this projection 73 with a locking member 75 at the upper end of which is a hook-like lateral projection 76 which, when the switch is closed, enters the recess or notch 74 so that the members 73 and 75 interlock. When the switch is opened, the end 76 of the member 75 is swung to one side or out of the notch 74.

It will be seen from the foregoing description that the entire switch operating mechanism, including the contact mechanism and operating mechanism is a self-contained unit which can be removed as a whole from the tank without disturbing or interfering with the terminals of the conductors which carry the current to and from the switch. In order that the switch may be readily lifted from the inclosure when the cover is removed a suitable bail or handle 77 is provided, this bail being connected to the operating shaft 34 shown clearly in Fig. 3. By mounting the fixed terminal contact blocks or members 69, 70 and 62, 63 and the supports therefor in the upper portion of the casing which includes the outwardly extending portions 15, 15ª, these conductive parts and their supports, which necessarily take up considerable space, are considerably above the active, circuit-rupturing fixed and movable contacts of the removable switch unit, when these contacts are in operative position within the casing where they are normally immersed in oil. The oil-containing portion of the casing may be of minimum size, and the general construction is such as provides for a minimum weight of material and a minimum quantity of oil for properly immersing the circuit-rupturing switch contacts, while maintaining all the desirable operating features of this type of switch wherein a complete switch unit is removable from and replaceable in an oil-containing casing and is connected to the line terminal contacts when in operative position in the casing. Thus it will be obvious that I have provided a switch which is extremely safe and reliable and is particularly adapted for use in buildings containing highly inflammable material.

Not only does the quick make-and-break mechanism render the arcing at the contacts small, but the volume of current passing through the switch is limited by the fuses mounted within the cover of the switch inclosure. By this arrangement of the fuses, the use of fuses in the conductors connected to the switch and exterior to the latter is done away with. The arrangement of the fuses is such that they may be readily replaced when necessary and easily inspected.

Furthermore the switch is safe from the standpoint of injury to the operator, for the reason that not only are the line conductors disconnected from the contact mechanism of the switch when the cover is removed, but it is impossible to remove or replace the cover unless the switch is open. In this manner the danger of the operator short circuiting any of the live parts or of being injured is practically eliminated.

The fact that the entire switch mechanism can be removed as a unit without disturbing the conductor terminals is a valuable feature for the reason that the switch can be cleaned or repaired much more conveniently and with less danger to the operator than with the present construction of switches. This is true particularly inasmuch as the contact mechanism is by the removal of the cover disconnected from the line or current supplying conductors and is rendered dead before the switch unit is removed from the tank. By disposing the detachable connection between the contact members associated with the line terminals and the fixed contacts of the removable switch-unit, or, at least, the major portion of such contact members, in the upper portion of the inclosure, that is, the portion of greater horizontal cross-sectional area, the necessary oil-containing space for properly immersing the active, circuit-rupturing contacts and the amount of oil for the same, and the weight of material of the casing may be reduced to a minimum.

What I claim as new and desire to secure by Letters Patent:—

1. In combination, in a switch, movable and stationary contact members, an operating shaft for the movable contact members, said movable and stationary contact members being suspended from said shaft and bodily movable therewith, an operating handle mounted on the shaft and movable relatively thereto, a spring having operative connections with the shaft and handle, a pair of pawls each acting at times to temporarily hold the shaft against movement while the handle is being moved a predetermined amount and energy is being stored in the spring, and means movable with the handle for tripping said pawls so that the shaft will be turned and the switch will be opened or closed with a snap action.

2. In combination, in a switch, movable and stationary contact members, an operating shaft for said movable contact members, an operating handle mounted on the shaft, a spring surrounding the shaft, a member secured to the shaft and provided with a laterally projecting portion extending between the ends of the spring and having a pair of notches, a member movable with the handle and having a laterally projecting portion also extending between the ends of the spring, pawls coöperating with the notched member, one of the pawls engaging one of the notches so as to hold the shaft against movement while the handle is moved a predetermined amount in one direction and energy is stored in the spring, and the other pawl engaging the other notch and holding the shaft against movement when the handle is moved in the opposite direction and energy is stored in the spring, and said member movable with the handle serving to trip the pawls so that the switch will be opened or closed with a snap action.

3. In a switch, the combination of an inclosure adapted to contain insulating fluid, a supporting frame removably mounted within said inclosure, coöperative movable and stationary contact members and operating mechanism therefor carried by said frame, said contact members being normally suspended in insulating fluid in said inclosure, a removable cover for said inclosure, line terminals disposed within said inclosure and above the normal fluid-containing portion thereof, detachable connections between said line terminals and certain of said stationary contact members, and coöperative interlocking members associated with said cover and said operating mechanism, said interlocking members preventing the removal of said cover when the switch is closed, and said frame, contact members and operating mechanism therefor being removable from said inclosure as a unit when the coöperative contact members are in circuit-open condition and the cover removed, and said detachable connections being broken on removal of said unit from said inclosure.

4. In a switch, the combination of an inclosure adapted to contain insulating fluid, switch mechanism removably supported in position in said inclosure and including coöperative relatively movable contact members and operating mechanism therefor in the form of a self-contained unit, said contact members being normally suspended in the normal fluid containing portion of said inclosure, line terminals within said inclosure and above the normal fluid-containing portion thereof, detachable connections between said line terminals and certain of said contact members, and means operative to insure that said unit is removable from said inclosure only when the coöperative contact members are in circuit-open condition, said detachable connections being broken on the removal of said unit from said inclosure.

5. In a switch, an inclosure having lateral extensions on two opposite sides, a removable switch unit comprising a supporting frame, movable and stationary contacts and operating mechanism, said extensions having secured thereto insulating supporting bars, a plurality of members supported by each of said bars, said members being adapted to be connected to conductor terminals and having spring jaws, and a plurality of members supported by said frame and connected to stationary contacts, said last named members engaging in said jaws whereby the unit may be removed without disturbing the terminals.

6. In a switch, the combination of a receptacle, a switch unit comprising fixed and movable contacts and operating mechanism therefor, said switch unit being removably mounted in said receptacle, a cover for said receptacle removable therefrom independently of said switch unit, line terminals mounted in fixed position relative to said receptacle, and detachable connections arranged in series-connected groups between the several line terminals and corresponding ones of said switch contacts, certain of said detachable connections being broken by removal of said cover from said receptacle and others of said detachable connections being broken by removal of said switch unit from said receptacle.

7. In a switch, a receptacle, a removable cover therefor, a plurality of relatively fixed contacts, a frame for supporting said fixed contacts, a plurality of relatively movable contacts, means for actuating said movable contacts into and out of engagement with said fixed contacts, said means comprising an operating shaft from which said fixed contact supporting frame and said movable contacts are suspended, conductor terminals supported on said frame and insulated therefrom, and fuses mounted on said cover and adapted to connect said terminals when the cover is in place on said receptacle and to disconnect the same when said cover is open, said switch and actuating means and said conductor terminals being bodily removable from said receptacle as a unit.

8. In a switch, the combination of a receptacle having a removable cover, a frame mounted in said receptacle and comprising two oppositely disposed members, fixed contacts supported in operative position by said members, a removable contact member comprising a yoke and bridging contacts mounted thereon and adapted to engage said fixed contacts, means for reciprocating said movable contact member comprising a shaft rotatably mounted in said frame and a toggle connection between said yoke and said shaft, said shaft and said cover being provided with interengaging members adapted to prevent the removal of said cover while said switch is in closed position, and detachably engaging contacts mounted on said frame and said cover for causing the switch parts to become dead when the cover is removed, said frame with its fixed and movable contacts and operating mechanism therefor being removable from said receptacle as a unit when said cover is open.

9. In a switch, the combination of a receptacle, a switch unit comprising relatively movable contacts and operating mechanism therefor, said switch unit being removably mounted in said receptacle, a cover for said receptacle removable therefrom independently of said switch unit, line terminals fixed in position relative to said receptacle, conductor terminals supported by said switch unit, certain of said conductor terminals being associated with certain of said switch contacts and others of said conductor terminals being detachably connected to certain of said line terminals, fuses mounted on said cover and serving when said cover is in position on said receptacle to detachably connect pairs of said conductor terminals, the detachable connection between said fuses and said pairs of conductor terminals being broken on removal of said cover from said receptacle, and the detachable connections between said line terminals and said conductor terminals being broken on the removal of said switch unit from said receptacle.

10. In a switch, the combination of a receptacle adapted to contain insulating fluid, a switch unit comprising relatively movable contacts and operating mechanism therefor, said switch unit being removably mounted in said receptacle with said contacts occupying the normal fluid-containing portion thereof, a cover for said receptacle removable therefrom independently of said switch unit, line terminals and detachable connections between said line terminals and certain ones of said contacts mounted in said receptacle above the normal fluid-containing portion thereof, and means for insuring that the circuit through said contacts is broken prior to removal of said unit from said receptacle, said means comprising a detachable connection in series with said contacts and broken by removal of said cover from said receptacle, the detachable connections between said line terminals and said contacts being broken on removal of said unit from said receptacle.

11. In combination, a receptacle adapted to contain insulating fluid and having its lower portion of smaller horizontal cross-sectional area than its upper portion, line terminal contacts in said receptacle, means for supporting said terminal contacts in operative position, switch mechanism comprising fixed and movable contacts and a support therefor removable from said receptacle as a unit, said fixed contacts comprising portions operatively engageable by said movable contacts, and portions adapted to be conductively connected with said first portions and engageable with said terminal contacts and said supporting means for said terminal contacts and the major portion of the part of said terminal contacts engageable with portions of said fixed contacts being disposed in the portion of said receptacle of greater cross-sectional area.

12. In combination, a receptacle having its lower portion of smaller horizontal cross-sectional area than its upper portion, line terminals disposed in operative position in the portion of said receptacle of greater cross-sectional area, switch mechanism comprising fixed and movable contacts and a support therefor removable from said receptacle as a unit, said fixed contacts comprising portions engageable by said movable contacts, and means operative to conductively connect said line terminals with the portions of said fixed contacts with which said movable contacts are engageable when said switch mechanism is in operative position in said receptacle, the movable contacts and the portions of said fixed contacts engageable thereby being disposed in the portion of said receptacle of reduced cross-sectional area when in operative position in said receptacle.

13. In combination, a receptacle adapted to contain insulating fluid and having its lower portion of reduced horizontal cross-sectional area, line terminal contacts in said receptacle, means for supporting said terminal contacts, said supporting means being disposed in the portion of said receptacle of greater cross-sectional area, switch mechanism comprising fixed and movable contacts and operating mechanism therefor removable from said receptacle as a unit, said fixed contacts comprising portions operatively engageable with said terminal contacts and portions engageable by said movable contacts, said latter portions of the fixed contacts and said movable contacts being disposed in the portion of said receptacle of reduced cross-sectional area and said portions of said fixed contacts engageable with said terminal contacts being disposed in the portion of said receptacle of greater cross-sectional area when said switch mechanism is in operative position in said receptacle.

14. In combination, a receptacle adapted to contain insulating fluid and having its lower portion of smaller horizontal cross-sectional area than its upper portion, line terminal contacts in said receptacle, means for supporting said terminal contacts, said supporting means being disposed in the portion of said receptacle of greater cross-sectional area, switch mechanism comprising fixed and movable contacts and operating mechanism therefor removable from said receptacle as a unit, said fixed contacts comprising portions operatively engageable with said terminal contacts and portions engageable by said movable contacts, said latter portions and said movable contacts being disposed in the portion of said receptacle of smaller cross-sectional area when said switch mechanism is in operative position in said receptacle.

15. In combination, in a switch, an inclosure having its upper portion of greater horizontal cross-sectional area than its lower portion, switch mechanism mounted in said inclosure and comprising relatively movable contacts and operating mechanism therefor removable from said inclosure as a unit, and terminal contact members insulatedly mounted in operative position in the portion of said inclosure of greater cross-sectional area, said contact members being adapted to be connected to line terminals and having a detachable connection with certain of the contacts of said switch mechanism which is broken by the removal of said switch mechanism from said receptacle.

16. In a switch, an inclosing casing having a lateral extension adjacent the upper edge thereof, terminal contact members and an insulating support therefor mounted on said extension, and switch mechanism comprising relatively movable contacts and operating mechanism therefor removable from said casing as a unit, said switch unit including conductive connections from certain of its contacts detachably connected to said terminal contact members when said switch unit is in operative position within said casing.

In testimony whereof, the signature of the inventor is affixed hereto.

HERBERT W. CHENEY.